Oct. 5, 1926. 1,602,257
A. E. SHIRLOW ET AL
METHOD OF AND MEANS FOR THE WINDING OF CINEMATOGRAPH FILMS AND THE LIKE
Filed Jan. 30, 1924     5 Sheets-Sheet 2

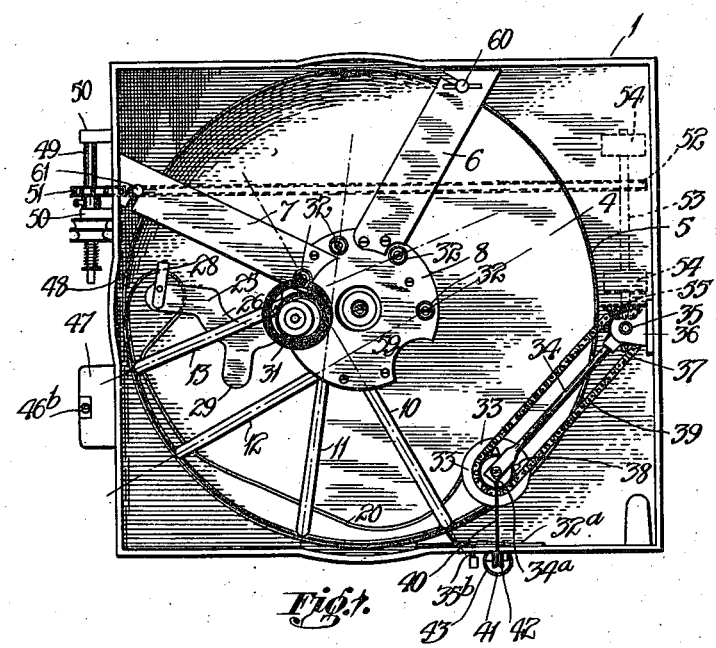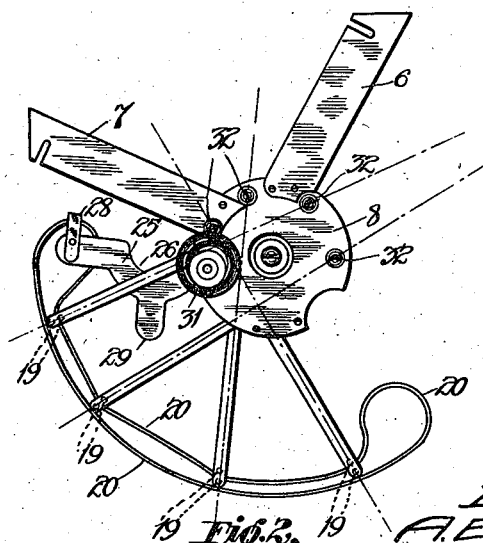

Inventors
A.E. Shirlow
T.B. McDiarmid
J. Patterson
by Langner, Parry, Card & Langner
Att'ys.

Oct. 5, 1926. 1,602,257
A. E. SHIRLOW ET AL
METHOD OF AND MEANS FOR THE WINDING OF CINEMATOGRAPH FILMS AND THE LIKE
Filed Jan. 30, 1924 5 Sheets-Sheet 3
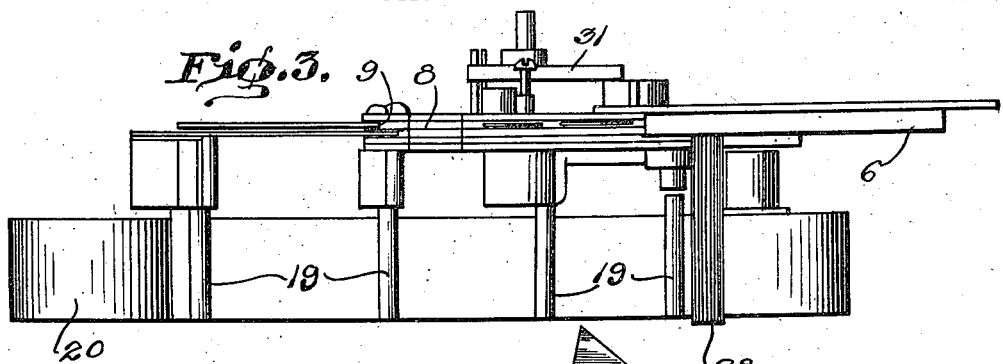
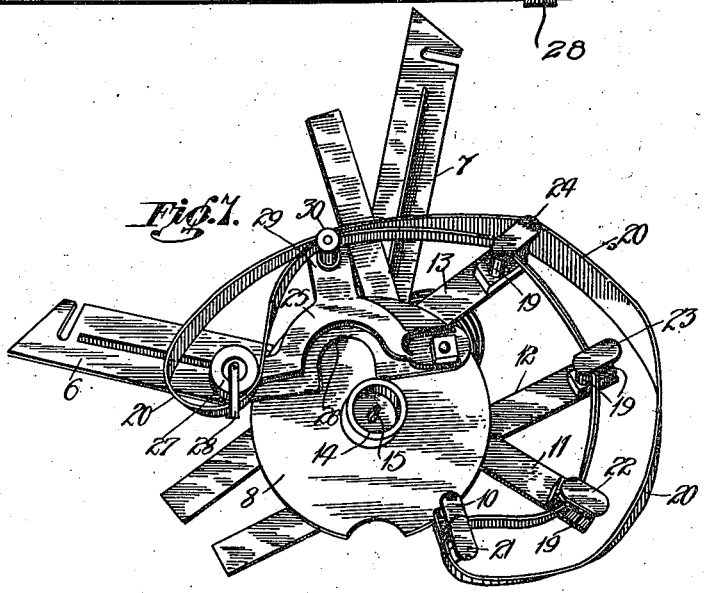
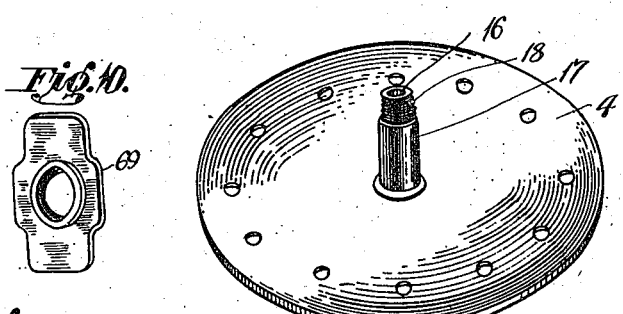
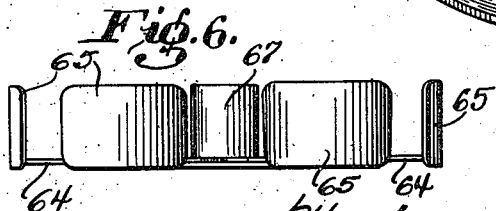
Inventors
A. E. Shirlow
T. B. McDiarmid
J. Patterson
by Langner, Parry, Card & Langner
Attys.

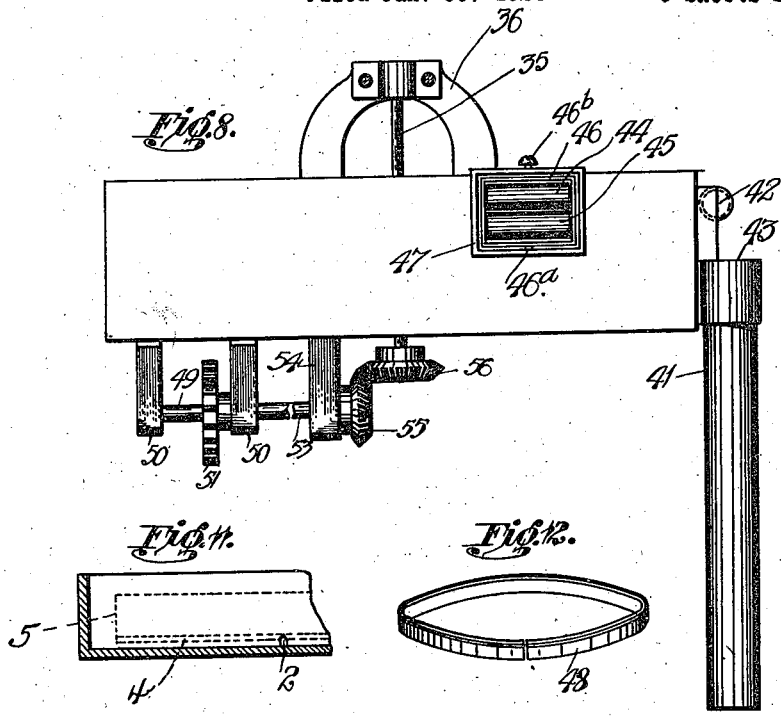
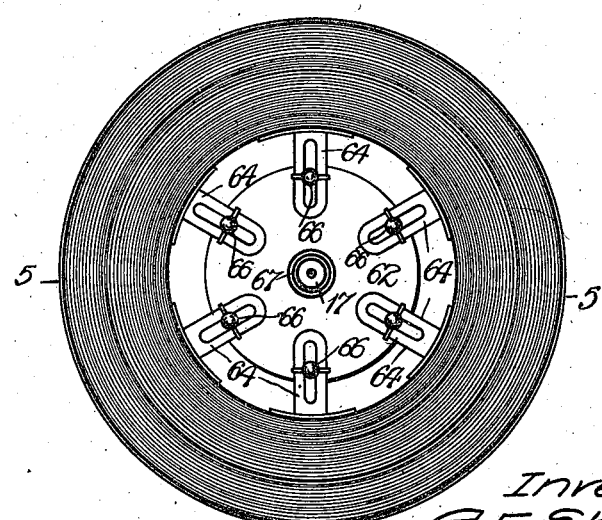

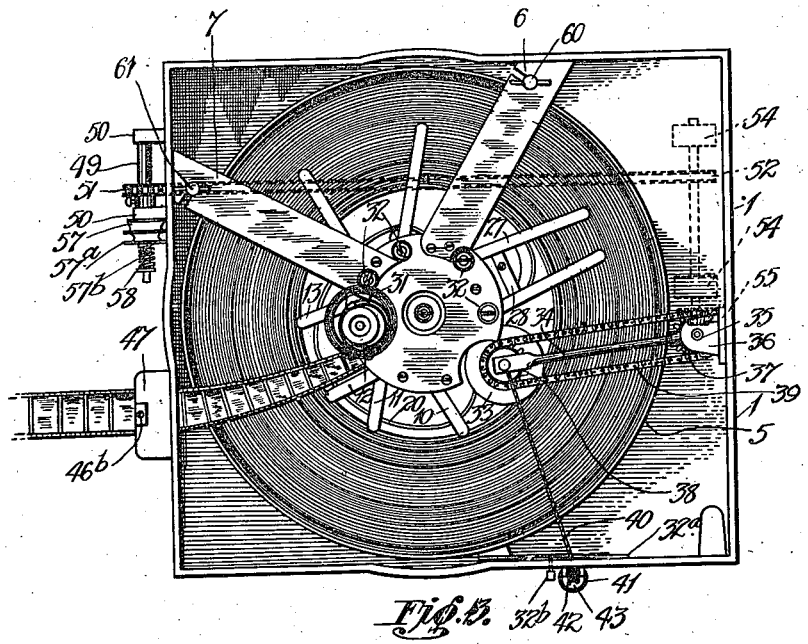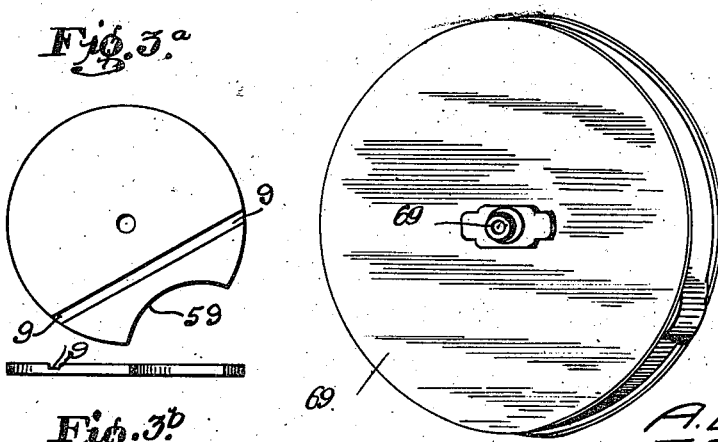

Patented Oct. 5, 1926.

1,602,257

UNITED STATES PATENT OFFICE.

ALBERT EDWARD SHIRLOW, THOMAS BARTLETT McDIARMID, AND JOHN PATTERSON, OF MELBOURNE, VICTORIA, AUSTRALIA.

METHOD OF AND MEANS FOR THE WINDING OF CINEMATOGRAPH FILMS AND THE LIKE.

Application filed January 30, 1924, Serial No. 689,501, and in Australia September 22, 1923.

This invention relates to the winding of cinematograph films and the like, and has been devised for the purpose of winding such films in a rapid and expeditious manner without the difficulties and breakages resulting with the use of mechanisms at present in use.

The prior art discloses means for eliminating the necessity of rewinding the already projected film in order to render same in a condition for immediate re-use, and the principle involved forms the basis of the present invention, which is adapted to more efficiently wind the film as it leaves the cinema machine.

The method employed according to this invention consists in the feeding of the film or the like from the projector to a flanged casing wherein an endless belt operates to pack the coils of the film as it is being rewound against and inside the flange of said rewinding casing.

The invention consists in means for winding cinematograph films and the like, characterized by the use within a disk-like rewinding casing of a flexible belt conforming to a substantial proportion of the periphery of said casing said belt forming an arc of the circle formed by the innermost convolution of the film as the film is being rewound.

The invention also consists in means for winding cinematograph films and the like, characterized by the use of an endless contact belt, so arranged that as the film convolutions multiply said belt moves inwardly in contact with the inner winding of the film to ensure the firm packing of the convolutions as they are formed within the rewinding casing.

The invention moreover consists in means for winding cinematograph films and the like, characterized by a looped contact belt provided with tension means at each end thereof and guides at intermediate portions thereof, so as to form guides along the length thereof, so as to form guides as the film coils are wound in the rewinding casing.

The invention furthermore consists in means for winding cinematograph films and the like, an endless belt adapted to pack and contact with the convolutions of the films as they are formed practically along the whole surface of each said convolution.

In the apparatus hereinafter described more fully the film is led through a vertically pivoted "sensitive" gate to the inside of the flange of the rewinding casing and the "title" end of the film is passed into a spring or flexible clip formed on the end of a flexible and divided circular band, said band being disposed around the inner surface of the flange of the rewinding casing and with its ends abutting or adjacent, the band being composed of an outer flexible metal band with an inner rubber or other suitable facing or lining, the said lining being adapted to hold the film against its surface and prevent the same from slipping thereon during the preliminary or commencement of the rewinding of the film as it passes from the projector to the spool or casing.

But in order to more readily understand the invention reference will now be made to the accompanying drawings in which:—

Figure 1 is a plan view of the apparatus preparatory to commencing a rewinding operation.

Figure 2 is a plan view of the device for packing the film, showing collapsible arms.

Figure 3 is a side elevation thereof.

Figure 3ᵃ is a face view of one of the individual discs making up center disc 8.

Figure 3ᵇ is an edge view of the element shown in Fig. 3ᵃ.

Figure 4:
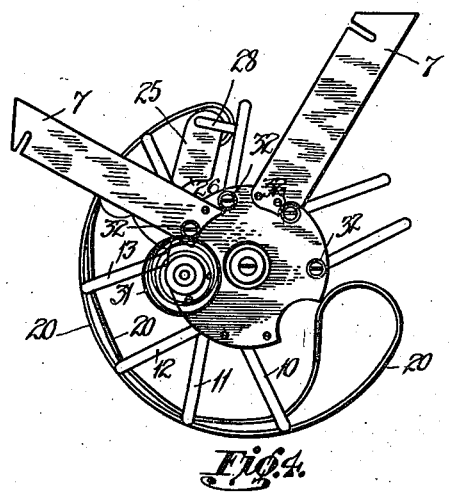

Figure 4 is a plan view of the device for packing the film showing position of collapsible arms when film has been partly wound.

Figure 5:
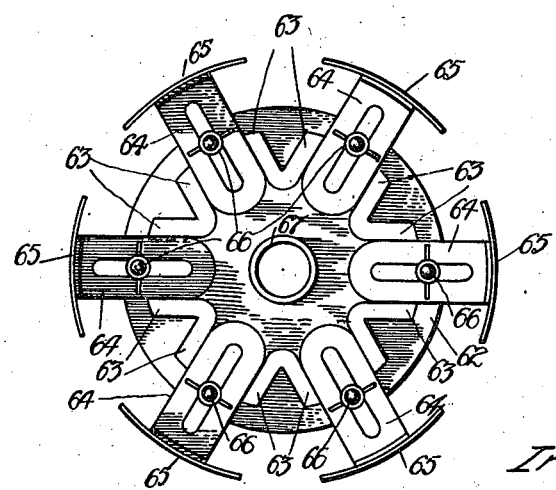

Figure 5 is a plan view of the adjustable centre device for use when removing the rewound film from the machine.

Figure 6 is a side elevation thereof.

Figure 7 is a perspective view showing underneath parts of the film packing device.

Figure 8 is a side elevation showing particularly the driving gear for actuating the endless belt device and sensitive gate for guiding the film after it leaves the cinema machine.

Figure 9 is a perspective view showing lower plate of spool with central boss.

Figure 10 is a perspective view of a nut for use therewith.

Figure 11 is a fragmentary view showing the method of supporting the winding disc.

Figure 12 is a perspective view of the flexible band against which the commencing layer of film engages.

Figure 13 is a plan view of a film completely wound, showing position of swinging arm and endless contact belt.

Figure 14 is a perspective view showing rewound film in a condition for projection.

Figure 15 is a view showing rewound film in disc and adjustable centre in position.

According to this invention a casing 1 is provided being open at the top and preferably arranged horizontally and centrally of this casing 1 a fixed spindle 2 projects receiving the boss 3 of a rewinding spool 4 which rotates thereon and which consists of a disc with the outer edge formed with a removable raised flange 5 forming a rewinding casing preferably slightly deeper than the width of the film being wound.

Supported on lugs or otherwise affixed to the inside of the casing 1 are slotted arms 6—7 connecting and securing a central disc 8 which is formed of a plurality of discs (see Figs. 3ᵃ and 3ᵇ) fitted together and formed with transverse slots 9 adapted to receive slidable arms 10—11—12—13 which are arranged in the disc 8 at different planes to allow each arm to move without fouling its fellow.

The disc 8 is formed on the underside with a hollow boss 14 surrounding a pin 15 which is adapted to enter a recess 16 formed in a boss 17 on the upper surface of the disc 4 while the hollow boss 14 passes over the upper end 18 of the boss 17 and acts as a support for the disc 4 during its revolutions.

The arms 10—11—12—13 (see Fig. 13) are fitted at the outer ends with supporting rollers 19 arranged in pairs and between which portion of the length of the endless belt 20 passes, said rollers being supported at the lower ends by means of plates 21—22—23—24.

Pivotally mounted to the underside of the disc 8 is a swinging arm 25 formed substantially centrally with a cut-away portion 26, the one end of said arm 25 being fitted with a roller 27 and a guide 28, the belt 20 passing between the guide 28 on the roller 27.

Formed on the arm 25 is an extension 29 on the end of which is a roller 30 which is adapted to support the endless belt 20 and prevent same from sagging detrimentally when the space between the film coils has reached the minimum dimension, i. e., when the film is almost or completely rewound.

The arm 25 is provided with means for exerting an even and uniform pressure on the endless belt 20 during its travel, the means consisting in affixing a coil spring 31 to the spindle to which said arm 25 is mounted and anchoring one end of said spring 31 to the disc 8 through which the slidable arms pass.

The disc 8 is fitted with means for retarding the sliding action of the arms 10—11—12—13 when so desired, i. e., when it is necessary to adjust the packing of the film as it is winding so as to ensure that the convolutions thereof are even and uniform.

The means described consists of arranging set screws 32 (see Fig. 4) through the disc and over each slidable arm 10—11—12—13, the set screws 32 acting against felt or other suitable composition wads or pads which are in direct contact at all times with the surface of the slidable arms 10—11—12—13 and according to the tension placed on said wads or pads so the movement of the slidable arms described may be accelerated or retarded as occasion demands.

Further, if desired to control the movement of the disc 4 a brake is mounted on the inside of the casing 1 and which consists of a flexible member 32ᵃ anchored to one end of the inside of the casing 1 whilst the other end is fitted with a pad or any suitable braking material such as felt or rubber, the tension or pressure on said brake being effected by means of an exterior set screw 32ᵇ operable from outside the casing 1.

The endless belt 20 passes around a roller 33 which is disposed on the end of a swinging arm 34 affixed to a spindle 35 which passes into a bracket 36 secured to the casing 1.

Disposed on the spindle 35 is a sprocket wheel 37 and on the opposite end of the arm 34 is a sprocket wheel 38, a suitable roller chain 39 connecting and meshing with the sprockets described.

Connecting the end 34ᵃ of the arm 34 is a cord or other flexible member 40 which connects at the opposite end of a slidable weight accommodated in a tube 41 which is affixed to the side of the casing 1, the cord being assisted in a free, even pull by passing same over a grooved pulley 42 arranged immediately above the mouth 43 of a tube 41.

The film on leaving the projector of the cinema machine passes through a sensitive gate consisting of rollers 44—45 which are horizontally disposed (see Fig. 8) and operating by mounting same in a cage 46 which is pivoted vertically and centrally by means of pins 46ᵃ and 46ᵇ to a supporting box 47 secured to the side of the casing 1.

Immediately in line with the opening between the rollers 44—45 is an opening in a side of the casing 1 and the film on passing therethrough is caught and held by a flexible band 48 comprising an outer steel or other band provided with an inner face of rubber or other resilient material of similar character, the band 48 being preferably of rubber, grips the inside surface of the flange 5 of the rewinding spool 4, the said band 48 being split vertically and between the split portions receiving and holding the title end of the projected film.

The means for actuating the rewinding apparatus consists essentially (see Figs. 1 and 13) of a sprocket wheel carried on a spindle 49 supported in brackets 50, a roller chain 51 connecting said sprocket with a sprocket 52 mounted on a spindle 53 working in brackets 54 secured to the inner part of the casing 1.

On the outer end of the spindle 53 is a bevel pinion 55 in mesh with a bevel pinion 56 disposed at right angles thereto, said bevel pinion 56 being rigidly affixed to the vertical spindle 35 which operates the sprocket 37 in turn operating the sprocket 38 by means of a chain 39.

On the outer end of the spindle 49 is a slipping clutch 57 comprising grooved pulleys 57a, a compression spring 57b being disposed on said spindle between a collar 58 and the surface of the grooved pulleys described and the member 57 is of fibre or other material, said member being rigidly secured to the spindle 49, the pressure exerted by the spring 57b being sufficient to drive the rewinding mechanism by the surfaces of the driving pulley 57a and the fibre disc 57 being constantly in contact, the action being such that it allows any variation of speed to be taken by the driving pulley, the face of which will slip on the fibre disc 57 thus preventing any excessive movement on the rewinding mechanism.

As the rewinding operation proceeds the swinging arm 34 moves inwardly towards a cut-out portion 59 formed on the disc 8 and the swinging arm 25 closes in about the boss 17 of the disc 4.

In the rewinding operation a portion of the film coil is disposed between the surface of the endless belt 20 and the flexible band 48, the film turning at right angles to the normal position on leaving the cinema machine thereby assuming a substantially vertical position, the endless belt 20 being in constant movement upon the surface of the film which keeps forming convolution after convolution by the action of the belt 20 which travels in the same direction as that of the disc 4 and as the rewinding proceeds and nears completion the slidable arms 10—11—12—13 close inwardly towards the disc 8 whilst the swinging arm 25 closes around the boss 17 of the disc 4.

Immediately the film is rewound the members connected to the disc 8 together with same are removed clear of the completed film by loosening wing nuts 60—61 and turning the slotted arms 6—7 so that the wing nuts clear same whence the whole of this part of the machine may be removed clear of the rewound film.

On this being done an adjustable center piece (see Figs. 5, 6 and 15) is placed in the opening formed in the centre of the rewound film, the adjustable centre piece consisting of a disc 62 of convenient size and affixed on the upper surface thereof are a plurality of radially arranged guides 63 adapted to support a plurality of radially disposed feet consisting of slotted plates 64 formed on the outer end with curved members 65 and these feet may be secured in any desired position by means of wing nuts 66, the stems of which pass through the slots formed by the feet, whilst centrally of the disc is a vertically rising collar 67 which is adapted to pass over the boss 17 of the disc 4.

Immediately that is done a disc 68 (see Fig. 14) is placed over the film and adjustable centre, the threaded portion of the central boss 17 receiving the nut 69 adapted to hold the film securely between the discs 4 and 68, when the film is in readiness for further projection, if the flange 5 be removed, or for transporting from place to place.

What we claim as our invention and desire to secure by Letters Patent is:—

1. Means for winding cinematograph films and the like inwardly, comprising a rewinding casing, an endless looped contact belt in the casing, tension means at each end of the looped belt, and movable guides at intermediate portions of the belt moving inwardly with the belt to maintain the latter in contact with each successive new innermost convolution of the film as the same is rewound and the number of convolutions increases within the casing.

2. Means for winding cinematograph films and the like inwardly, comprising a rewinding casing, an endless belt in the casing for packing and contacting with the film convolutions as they are formed substantially along the entire inner surface of each innermost convolution, and driving means for the belt, said driving means also maintaining a uniform pressure on said belt and moving inwardly therewith as the film convolutions multiply within the casing on rewinding the film.

3. Rewinding mechanism for cinematograph films and the like, comprising an outer casing, a rewinding casing, an endless contact belt in the rewinding casing, a centrally located disk formed by a plurality of disks secured together in the rewinding casing, each of the disks forming part of the central disk having a transverse slot, arms sliding in the slots, twin rollers at the outer end of each arm to support and carry the endless belt, a swinging arm pivoted to the underside of the central disk, a roller on the swinging arm, driving means for the belt including a driven roller, one end loop of the belt passing around the driven roller and the other end loop passing around the roller on the swinging arm, an extension on the swinging arm carrying a safety roller to prevent the belt from sagging as the convolutions of the film being rewound a minimum diameter and the sliding arms move inwardly, slotted arms rigidly affixed to the central disk at one end, and set screws disposed on the inside of the outer casing projecting through the slots on the slotted arms cooperating with wing nuts to hold the arms and the attached central disk in position during rewinding of the film.

4. Means for winding cinematograph films and the like inwardly, comprising a flanged rewinding casing, an endless contact belt within the casing, a disk within the casing, and slidable arms supported by the disk for maintaining the belt in contact with the film convolutions, said arms closing in upon the disk as the film convolutions multiply within the casing on rewinding the film.

5. Means for winding cinematograph films and the like, comprising the combination of a rewinding casing, an endless contact belt within said casing, a centrally located disk built up from a plurality of thin disks in the casing, and slidable arms supporting said belt operating in different planes and moving through the central disk.

6. Means for winding cinematograph films and the like, comprising a rewinding casing, a centrally located disk in the casing, inwardly slidable arms supported on the disk and sliding therethrough, and adjustable screw operated friction means for affecting resistance to and regulating, the sliding movement of said arms.

7. Means for winding cinematograph films and the like, comprising a rewinding casing, an endless contact belt therein, a centrally located disk in the casing, sliding arms carried by the disk and having means for automatically exerting an even and uniform tension on the endless belt, a swinging arm pivoted to the underside of the disk, and a coil spring having one end anchored to the pivot and wound around the same and the other end secured to the disk, so that as the film convolutions multiply the tension of the swinging arm is maintained to effectively guide the endless belt.

8. Means for winding cinematograph films and the like inwardly, comprising the combination of a rewinding casing, an endless belt within the casing for packing and contacting with the film convolutions as they are formed substantially along the entire inner surface of each innermost convolution, and means in the casing for operating the belt and maintaining the same against each successive new innermost convolution of the film as the same is rewound and the number of convolutions increases within the casing.

Signed at Melbourne, Victoria, Australia, this 18th day of December, 1923.

ALBERT EDWARD SHIRLOW.
THOMAS BARTLETT McDIARMID.
JOHN PATTERSON.